N. J. CONRAD

PRIMARY CUT-OUT

March 4, 1930.

Filed March 7, 1919

Re. 17,612

3 Sheets-Sheet 1

Witnesses:
Harry R. L. White
W. P. Kilroy

Inventor
Nicholas J. Conrad,
By Brown Bottner & Dringer
Attys.

N. J. CONRAD

PRIMARY CUT-OUT

March 4, 1930.

Filed March 7, 1919

Re. 17,612

3 Sheets-Sheet 2

Witnesses:
Harry R. L. White
W. P. Kilroy

Inventor:
Nicholas J. Conrad

By Brown Boettcher & Dienner
Att'ys.

N. J. CONRAD

PRIMARY CUT-OUT

March 4, 1930.

Filed March 7, 1919

Re. 17,612

3 Sheets-Sheet 3

Witnesses:
Harry P. L. White
W. P. Kilroy

Inventor
Nicholas J. Conrad.
By Brown Bottner & Dienner
Attys

Reissued Mar. 4, 1930 Re. 17,612

UNITED STATES PATENT OFFICE

NICHOLAS J. CONRAD, OF WINNETKA, ILLINOIS, ASSIGNOR TO SCHWEITZER & CONRAD, OF CHICAGO, ILLINOIS, A CORPORATION OF ILLINOIS

PRIMARY CUT-OUT

Original No. 1,466,423, dated August 28, 1923, Serial No. 281,215, filed March 7, 1919. Reissue No. 17,214, dated February 12, 1929, Serial No. 319,995, filed November 16, 1928. This application for reissue filed December 6, 1929. Serial No. 412,271.

My invention relates to cut-outs for electrical circuits. More particularly my invention relates to an improved cut-out for the primary circuits of an electrical distribution system. Primary circuits usually extend from electrical sub-stations, or transformer stations on a high potential line, out over the immediate vicinity and supply current to the service transformers for light and power distribution. Such circuits ordinarily carry potentials ranging from 1,000 to 15,000 volts.

Switching in this type of circuit is made difficult by the moderately high voltage, the requirement for exposed overhead installation, which precludes large or complicated disconnecting means, and the large number of such circuits in the usual distribution net which prohibits the use of costly apparatus.

A form of connecting means used extensively in these circuits is the ordinary type of plug and socket cut-out, wherein the plug carries a fusible link adapted to have connection with terminals in the socket, which terminals are connected to the line. This provides a simple and inexpensive construction but does not afford the desired security against injury to the operator or to the adjacent apparatus, nor is it reliable in relieving disturbances on the line, and it is subject to damage in relieving these disturbances. As ordinarily constructed, this type of cut-out is difficult and dangerous to operate, as the entire explosive force of blowing of the fuse by plugging into a short-circuited line is discharged directly into the hand of the operator. The operator is generally below or at one side of the cut-out and the blowing of the fuse—if he plugs in upon a short-circuited line—is dangerous, and is aways extremely disagreeable.

My invention aims to provide an improved form of cut-out wherein such explosive energy is discharged harmlessly out of the other end of the socket, away from the point of insertion of the plug, and away from the position of the operator, with a consequent impossibility of burning the operator. Another object is to provide an improved form of fuse device in the cut-out which will quickly relieve any disturbance on the line without injury to the cut-out. My invention furthermore provides a durable weather-proof structure, particularly adapted for installation on a pole top or cross-arm, in suitable relation to the transformer or other apparatus to be disconnected.

In the accompanying drawings, I have illustrated one manner in which my invention may be embodied in a practical operative construction.

Figure 1:
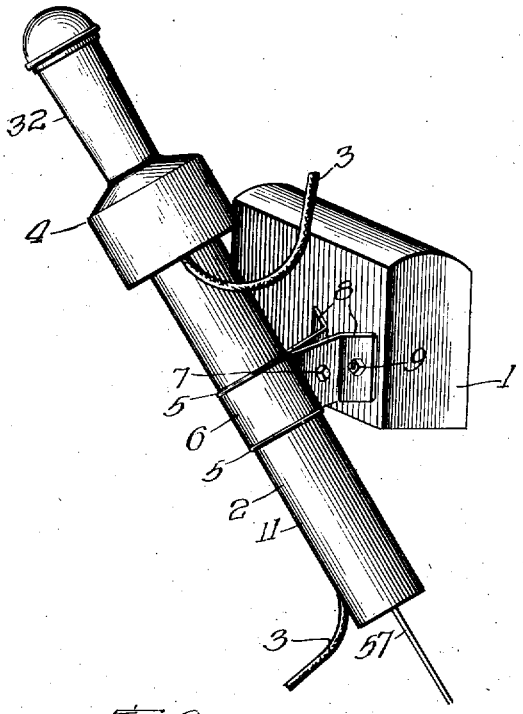
Figure 1 is a view illustrating my improved form of cut-out mounted upon the cross-arm of a transformer pole.
Figure 7:
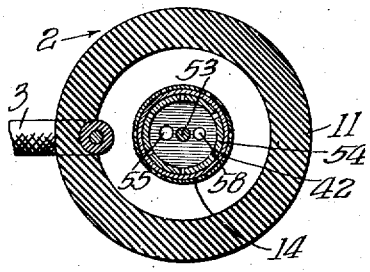
Figure 7 is a transverse sectional view taken on the line 7—7 of Figure 4.

In Figure 1 I have illustrated a typical installation of my improved cut-out upon the cross-arm 1 of a transformer pole, or other point of disconnection. The cut-out mainly comprises an outer socket member 2, which carries the main contact terminals included in the line 3—3, and the removable plug member 4, which bears the fuse device for interrupting the circuit in case of overload or short circuit. It will be noted that the plug member 4 is adapted for insertion in the top of the socket member 2, this arrangement bearing particular relation to the type of fuse employed, as I shall presently describe.

The socket member 2 preferably consists of a tubular member of insulation formed with two small circumferential beads 5—5, between which engages a clamp 6. The clamp 6 is gripped tightly about the body of the socket 2 by a bolt 7, extending through the sides of the clamp. The ends of the clamp 6 are bent laterally to form feet 8—8, which are screwed or bolted to the cross-arm 1, as indicated at 9. These feet are also bent diagonally to the body of the clamp to incline the lower end of the socket member 2 down beneath the cross-arm 1, and into the clear. It is from the lower end of the socket 2 that all discharges caused by the violent blowing of the fuse are relieved, and it will be noted that this end is directed away from any position the operator, or any part of his body, may assume when in the act of inserting the plug member.

Figure 2:
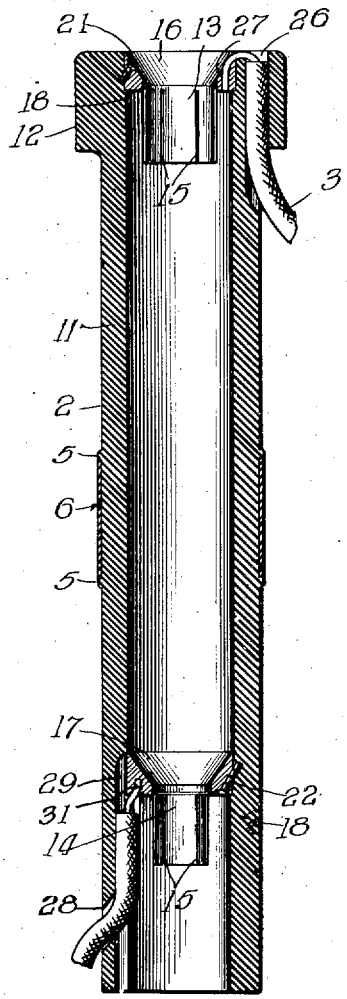
Figure 2 is a vertical sectional view of the socket member of the cut-out.
Figure 4:
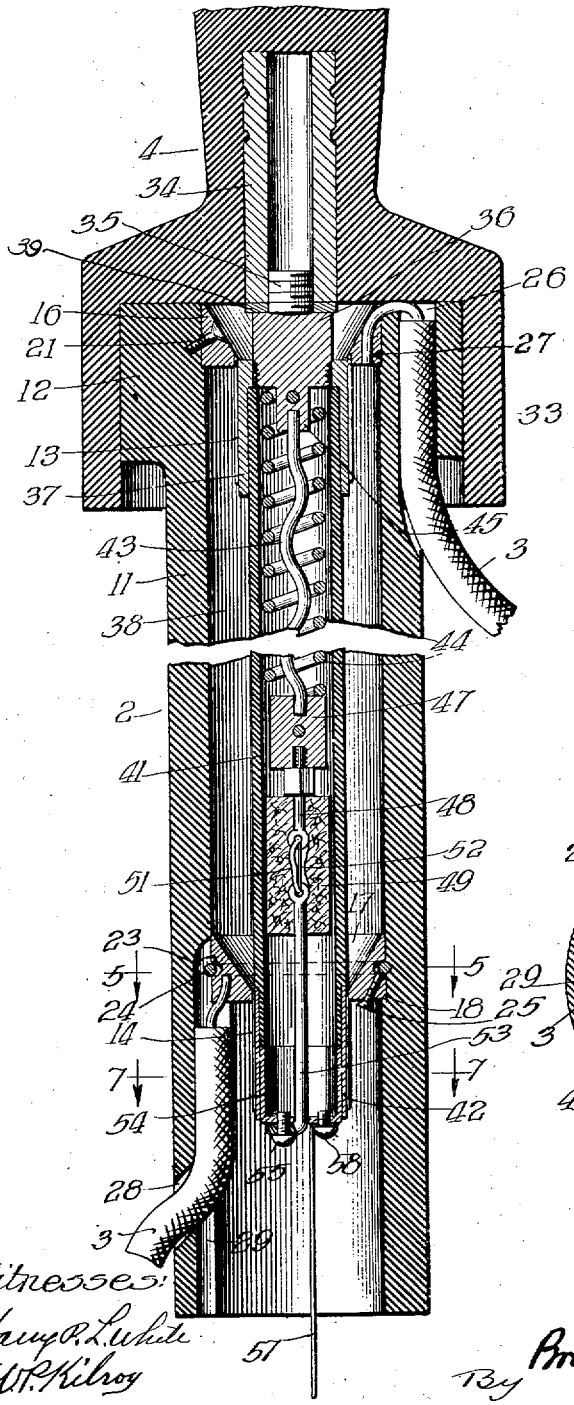
Figure 4 is a vertical sectional view showing the plug and socket members in operative association.
Figure 6:
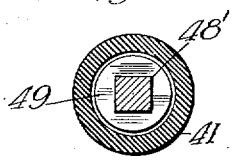
Figure 6 is a transverse sectional view taken on the line 6—6 of Figure 3.
Figure 5:
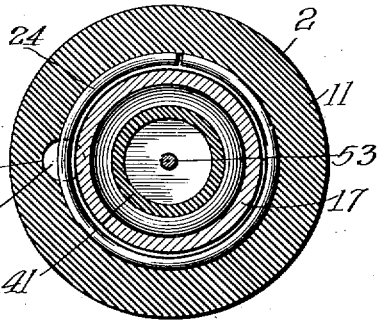
Figure 5 is a transverse sectional view taken on the line 5—5 of Figure 4.

Referring to the detailed construction of socket member 2, as shown in Figures 2 and 4, it will be noted that this member is in the form of a hollow sleeve 11, having an enlarged head 12, which sleeve is provided with contact terminals at the upper and lower ends of a central bore for receiving the plug member 4. This socket member is preferably constructed of an insulating material, such as bakelite, or bakelized fibre. The contact terminals are each made in the form of short sleeves 13 and 14, which are slotted at numerous points as indicated at 15 to afford a greater resiliency of contact with the ferrules on the fuse member of the plug 4. These contact sleeves depend from two large conducting rings 16 and 17, in which the sleeves are soldered. The conducting rings 16 and 17 are held in their respective ends of the sleeve member 11 by engaging upon the shoulders 18—18. The shoulders 18 are formed by making the intermediate portion of the bore of the sleeve of a slightly smaller diameter than the upper end, and the lower end of a diameter slightly smaller than the intermediate portion. The upper conducting ring 16 is held to its shoulder by a screw 21 threading diagonally through the ring and engaging the inner surface of the sleeve, and the lower conducting ring is similarly held by a diagonal screw 22, which is accessible through the open bottom of the sleeve 11. In Figures 4 and 5 I have illustrated a slightly different method of retaining the lower conducting ring 17 upon its shoulder 18. A groove is formed about the circumference of the ring 17, and matches with a similar groove in the sleeve 11, as indicated at 23, and in these grooves is confined a ring 24 which is split transversely as indicated in Figure 5. A screw 25 threading diagonally up thru the bottom of the ring 17 may be employed for spreading the split ring 24 out into engagement in both grooves. In placing the contact ring 17 and the split ring 24 within the sleeve 11 the two are merely pushed down from the top of the sleeve, the resiliency of the split ring permitting it to be sprung inwardly into the groove in the contact ring, until the split ring engages with the groove 23 in the sleeve 11, whereupon it springs outwardly under its own resiliency and locks the contact ring in place.

The line connections are made by extending one side of the line 3 up thru a hole 26 in the enlarged head 12 and into the interior of the socket where it is soldered in a hole 27 in the upper conducting ring 16. The other side of the line 3 enters the bottom of the socket 2 through a hole 28 and passes up through a groove 29, and is soldered in a hole 31 in the lower conducting ring 17. The upper faces of both conducting rings 16 and 17 are made conical, to aid in centering the plug member 4, when the latter is being inserted into the socket 2.

Figure 3:
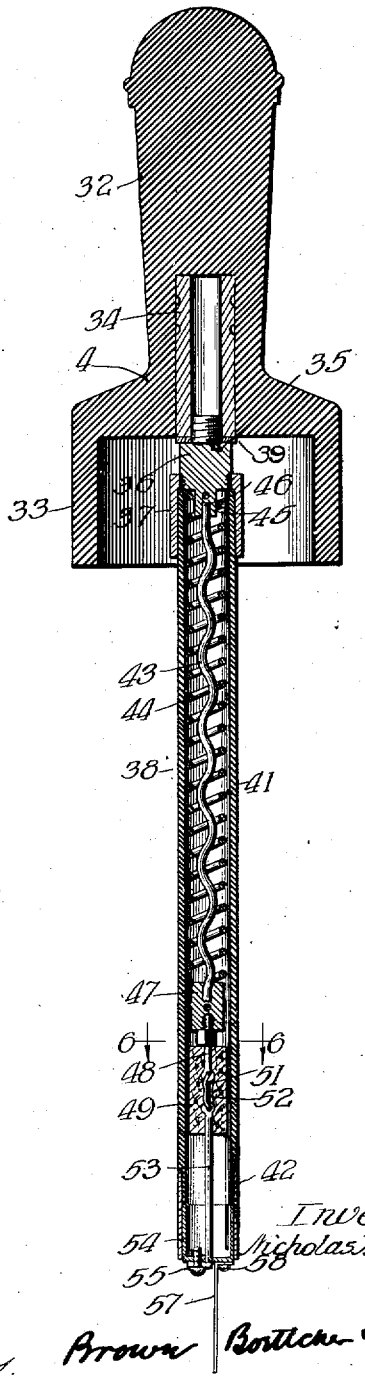
Figure 3 is a vertical sectional view of the plug member of the cut-out.

Referring to the detailed construction of the plug member 4, as shown in Figure 3, the handle 32, which is of bakelite, rubber, or some suitable insulation, is formed with a depending hood 33, which is adapted to set down over the head 12, on the end of the socket 2, thereby excluding moisture and shielding the operator's hand from any possible injury in pulling or inserting the plug. A polygonal metallic insert 34 is molded in the handle 32, and is tapped for receiving the threaded end 35 of the conducting stud 36. The stud 36 is threaded externally for the engagement of the upper contact ferrule 37 on the fuse 38. A lock washer 39 is interposed between the stud 36 and the tapped insert 34, to bind this threaded connection so that the ferrule 37 will unscrew first from the stud 36 in taking the fuse apart.

The fuse which I employ in my improved cut-out is novel in construction and operation, combining the advantages characteristic of the spring and expulsion types of fuses. When the abnormal condition on the line is of minor degree. the spring action of the fuse will alone suffice to extinguish the arc generated by the melting of the fusible link. When the explosive condition is pronounced, as during a short circuit or heavy overload, the expulsion action of the fuse effectually extinguishes the arc by expelling the lower contact member from the end of the fuse case and blowing the arc out. This will be more apparent after a detailed description of the construction and operation of the fuse.

Figure 8:
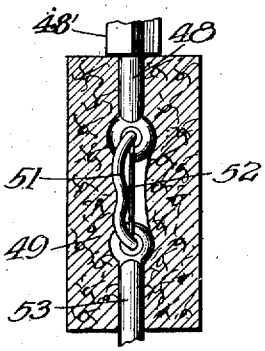
Figure 8 is a detail view showing the disposal of the fusible link and high resistance wire in the surrounding cork.
Figure 9:
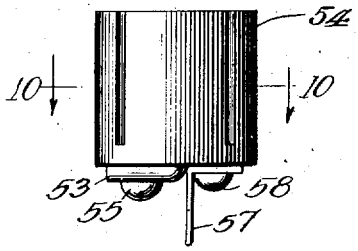
Figure 9 is an elevational view of the releasable end cap, which closes off the bottom of the fuse; and, Figure 10 is a cross-sectional view of the same.
Figure 10:
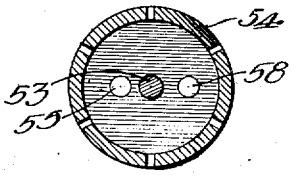

Referring again to Figure 3, the fuse 38 is enclosed in a tube 41 of fibre or bakelite, the upper end of which is secured to the ferrule 37. At its lower end, the outer surface of the tube 41 is machined down to a reduced diameter to receive the lower ferrule 42, which lies flush with the surface of the tube 41. Inclosed in the tube 41 is a large stranded conductor 43, connecting the upper ferrule 37 with the fusible link, which I shall presently describe, and a tension spring 44 which functions to separate the ends of the fusible link when the latter melts under abnormal current flow. Both the conductor 43 and the spring 44 have their upper ends secured in holes in a stem member 45, which is an extension of the stud 36, as indicated at 46. At its lower end the stranded conductor 43 is soldered into a hole in the end of a stem 47, and the tension spring 44 is similarly secured in a transverse hole in the stem. A link or terminal member 48 threads into the bottom of the stem 47, and extends down into a cork 49, or similar heat confining block. This terminal member is formed with a square shank portion 48′ for grasping with a tool to facilitate threading the terminal member into the stem 47. In the cork 49 the terminal member 48 has connection with a fuse wire 51, of prescribed current carrying capacity, and a small high resistance wire 52 of large tensile strength. These are clearly shown in Figure 8. The end of the terminal member 48 is flattened out into the shape of an eye, and linking this eye to a similar eye in the end of a large conducting wire 53 is the fuse wire 51 and tensile wire 52. The tensile wire 52 is arranged to bear the mechanical stress imposed by the tension of the spring 44. The conductor 53 extends out of the cork 49 and down thru a hole in the end cap 54 where it has connection on the outside thereof by a screw 55. This end cap is turned up in the form of a thimble, and is provided with vertical slots spaced about its periphery to secure a spring fit in the lower end of the ferrule 42. The reaction of the tension spring 44 is borne by the upper edge of the cap 54 abutting the lower edge of the insulating tube 41.

A notable feature of this fuse construction is that the action on violent blowing is a combination of spring action and expulsive action.

For illustration, consider the fuse as blowing on a dead short circuit or very heavy overload. The fusible wire 51 will blow and the tensile wire 52 at about the same instant, whereupon the terminal member 48 will be jerked out of the cork 49 up into the upper end of the tube 41. Under an ordinary overload condition the rapidly enlarging gap and the tendency of the cork 49 to confine the arc drawn from the tip of the terminal 53 would suffice to extinguish the arc before the terminal 48 had traveled any considerable distance, but if the blowing is violent the extreme temperatures generated by the arc will instantly develop an explosive air pressure in the tube 41. As a consequence, the entire group of elements, consisting of the cork 49, the terminal 53, and the end cap 54, will be blown out of the end of the tube 41 and the arc with them.

For the purpose of giving a visual indication that the fuse has been thus blown, I attach an indicating strip 57, which is preferably in the form of a long strip of celluloid, to the bottom of the end cap 54, by the screw 58, and extend this strip down out of the bottom of the socket 2. The absence of this strip indicates that the fuse has been violently blown. To determine whether the fuse element is still intact, or has fused under light overload without expelling the end cap, it is only necessary to slightly pull this indicating strip 57; if the fuse is still intact the tension of the spring 44 will be felt, otherwise the end cap 54 can be drawn out of the bottom of the fuse.

To renew the fusible link, the tube 41 is first removed by unscrewing the upper ferrule 37 from the stud 36. The fusible link 51, the tensile wire 52, and, if necessary, the terminal members 48 and 53, are then replaced and the cork 49 is stripped over the terminal members to surround the fusible link and tensile wire. The conductor or terminal member 53 is originally quite long, and thus it may be threaded down thru the tube 41 and thru the central hole in the end cap 54. The conductor 53 is then drawn up to apply tension to the spring 44 and is fastened to the screw 55, and its end cut off.

The provision of the cork 49 renders the fusible link 51 immune to atmospheric influences, which is an important factor in air fuses. The fusible link is doubly protected in this respect by the cork 49, the natural resiliency of which makes it snugly embrace the terminal members 48 and 53, and also by the end cap 54 which closes the lower end of the tube 41 against the entrance of atmospheric variations. The cork 49 is arranged to fit quite closely in the tube 41, and this tends to isolate the area above the cork from atmospheric influences, whereby the possibility of these influences penetrating thru to the fusible link is still further reduced.

A further utility of the cork is that of assisting in the extinction of the arc by closing the upper hole as soon as the upper terminal member has withdrawn, and thus either "strangling" the arc or closely confining it to the tip of the lower terminal member 53. Due to its close fit in the tube 41, the cork receives the full force of the explosive air pressure developed in the tube, and drives everything before it when it is expelled.

From the foregoing description, it will be apparent that the expulsive action of the fuse has particular co-operation with the general construction and mounting of the cut-out. On expulsion action the fuse requires immediate and clear access to the atmosphere, and the only practical provision for this is by leaving one end of the socket entirely open. This end is conveniently made the lower end, as there are no arc extinguishing liquids to be lost, and a satisfactory weather-proof construction results. The oblique mounting of the cut-out directs the discharge of the fuse down and away from the position of the operator, and thus there is practically no possibility of the operator being burned by this discharge.

While I have shown and described my invention with reference to the particular details of construction of one embodiment, it is to be understood that the invention may appear in different forms, and with numerous modifications and variations such as will suggest themselves to one skilled in the art, but I consider all such modifications and variations to be included within the scope of my invention.

I claim:

1. In a cut-out, a plug member and a co-operating socket member, said socket member comprising a sleeve of insulation open at both ends and having stationary contacts therein, the plug member being insertable into one end of the sleeve and the other end of said sleeve having a straight unobstructed opening, said plug member comprising a fuse having terminal contacts for engagement with said stationary contacts and a terminal member free to be expelled through the straight unobstructed opening of the socket member by blowing of the fuse.

2. In a cut-out, a socket member comprising a sleeve of insulation open at both ends and having stationary contacts positioned in from one end, a plug member comprising a fuse insertable into the other end of said sleeve and having terminal contacts for engagement with said stationary contacts and a releasably mounted terminal member positioned beyond said stationary contacts and free to be blown off by blowing of the fuse, the sleeve member extending beyond said releasably mounted terminal member to form a straight unobstructed opening for the expulsion of said terminal member.

3. In a cut-out, a plug member, and a co-operating socket member, said socket member comprising a sleeve of insulation open at both ends and having stationary contacts therein, said plug member comprising a tube of insulation, contacts on said tube adapted to engage with said stationary contacts, a fusible element in said tube, a terminal member at the end of said tube in conducting relation with said fusible element, said plug member adapted for insertion into one end of said sleeve, the other end of said sleeve having a straight unobstructed opening to atmosphere to permit the expulsion of said terminal member upon the blowing of said fusible element.

4. In combination, a plug member comprising a tube of insulation, terminal contacts on said tube, a fusible element in said tube, spring means connected to one end of said fusible element, the other end of said fusible element being connected to a releasable terminal member at the end of said tube, a socket member comprising a sleeve of insulation having stationary contacts therein for engagement with said terminal contacts, said plug member adapted to be inserted into one end of said sleeve, the other end of said sleeve having a straight unobstructed opening to atmosphere to permit the discharge of said releasable terminal member when the fusible element blows.

5. In combination, a plug member comprising a tube of insulation, contact ferrules on said tube, a fusible element in said tube, spring means connected to one end of said fusible element, the other end of said fusible element being connected to a releasable terminal member closing off one end of said tube and having connection with the adjacent contact ferrule, a socket member comprising a sleeve of insulation having stationary contacts therein for engagement with the contact ferrules, said plug member adapted to be inserted into one end of said sleeve, the other end of said sleeve having an unobstructed axial opening to permit the discharge of said releasable terminal member when the fusible element blows.

6. In combination, a socket member and a co-operating plug member adapted to be inserted in the upper end of the socket member, said socket member comprising a hollow sleeve of insulation having stationary contacts therein, an air expulsion fuse carried by said plug member comprising a tube of insulation having contact ferrules thereon adapted to engage with said stationary contacts, a fusible element in said tube, a spring in said tube tending to separate said fusible element, a releasable cap closing the bottom of said tube and having contact with the lower contact ferrule, said fusible element being connected to said releasable cap, the lower end of said sleeve having a straight unobstructed opening to atmosphere to permit the expulsion of said releasable cap upon the operation of said fuse.

7. In combination, a socket member and a cooperating plug member adapted to be inserted into the upper end of said socket member, said socket member comprising a hollow sleeve of insulation having stationary contacts therein, a fuse carried by said plug member comprising a tube of insulation having contact ferrules thereon adapted to engage with said stationary contacts, a pair of terminal members in said tube, a fusible link connecting said terminal members, a spring connected to the upper terminal member and tending to separate said terminal members, a releasable end cap closing the bottom of said tube and engaging with the lower contact ferrule, the lower terminal member being attached to said end cap, the lower end of said sleeve having a straight unobstructed opening to atmosphere to permit the expulsion of the lower terminal member and end cap upon the blowing of said fusible link.

8. In a cut-out, a socket member and a cooperating plug member adapted to be inserted into the upper end of said socket member, said socket member comprising a hollow sleeve of insulation, circular contact members supported on shoulders in said sleeve, said contact members being of different diameters, a fuse carried by said plug member, said fuse comprising a tube of insulation, contact ferrules on the ends of said tube, a pair of terminal members in said tube, a fusible link connecting said terminal members, a tension spring connected between the upper terminal member and the upper end of said tube, a releasable end cap fitting into the bottom contact ferrule, the lower terminal member being attached to said releasable end cap.

9. In a cut-out, a plug member and a co-operating socket member, said socket member comprising a sleeve of insulation having stationary contacts therein, said plug member comprising a fuse having terminal contacts thereon adapted to engage with said stationary contacts, said plug member adapted for insertion into one end of said sleeve, and the other end of said sleeve being open to permit the expulsion of the arc drawn in the operation of said fuse, and visual indicating means projecting from said cut-out for indicating the condition of said fuse.

10. In a cut-out, a plug member and a co-operating socket member, said socket member comprising a sleeve of insulation having stationary contacts therein, said plug member comprising an expulsion fuse having terminal contacts thereon adapted to engage with said stationary contacts, a terminal member in said fuse adapted to be expelled by the operation thereof, said plug member adapted for insertion into one end of said sleeve, the other end of the sleeve being open to permit the expulsion of said terminal member, and visual indicating means controlled by the expulsion of said terminal member for indicating the condition of said fuse.

11. In a cut-out, a socket member and a co-operating member adapted to be inserted into the upper end of said socket member, said socket member comprising a sleeve of insulation, a clamp on said sleeve for mounting said socket, stationary contacts in said sleeve for connection in the line, said plug member comprising a handle, a hood for enclosing the upper end of said sleeve, a fuse having terminal contacts thereon adapted to engage with said stationary contacts, and a cap on the end of said plug adapted to be blown out of the end of said sleeve.

12. An air fuse comprising a sleeve of insulation having contact terminals thereon, fuse terminals in the sleeve, a fuse between the fuse terminals, a metallic plug loosely held in one end of the sleeve connected to one contact terminal and one fuse terminal, a closure for the other end of the sleeve, spring means connected to the other terminal, and a cork covering the fuse and the ends of the fuse terminals, said sleeve and plug enclosing a body of air.

13. In an air expulsion fuse, the combination of a casing, one end of which is open, a pair of terminal members in said casing, a fuse between said terminal members, spring means tending to separate said terminal members, one of said terminal members having a releasable mounting adjacent the open end of said casing, said casing being adapted to trap the air pressure generated by the blowing of said fuse and thereby forcibly expel said latter terminal member bodily through the open end of said casing.

14. In an air expulsion fuse, the combination of a casing, one end of which is open, a first terminal member in said casing, a second terminal member, a fuse between said terminal members, spring means tending to separate said terminal members, contact means having connection with both of said terminal members, said second terminal member comprising means for substantially closing the open end of said casing, said second terminal member being releasably mounted adjacent said open end, said latter means being adapted to trap the pressure generated in said casing by the blowing of said fuse whereby to forcibly expel said second terminal member from said casing and quench the arc.

15. In an air expulsion fuse, the combination of a tubular socket, a co-operating plug member adapted to be inserted into the upper end of said tubular socket, stationary contacts associated with said tubular socket, terminal contacts on said plug member adapted to engage with said stationary contacts, a fuse carried by said plug member, fuse terminals carried by said plug member and connected to said fuse, the lower fuse terminal having releasable connection with said plug member, the lower end of said tubular socket having a straight unobstructed opening to atmosphere to permit the free expulsion of said lower fuse terminal therethrough under the explosive pressure generated by the blowing of the fuse, and means carried by said plug member for closing off the upper end of said tubular socket.

16. In a cut-out, the combination of a socket member, a co-operating plug member adapted to be inserted into said socket member, said socket member comprising a plurality of stationary contacts, said plug member comprising a sleeve of insulation having contact terminals thereon adapted to engage with said stationary contacts, a pair of fuse terminals in said sleeve, a fuse between said fuse terminals, a member covering and enclosing said fuse, means for releasably connecting one of said fuse terminals with the adjacent contact terminal on said sleeve, the adjacent end of said socket member having an unobstructed opening to atmosphere to permit the free expulsion of said latter fuse terminal under the gas pressure created in said sleeve by the blowing of said fuse.

17. In a cut-out, the combination of a socket member, and a co-operating plug member adapted to be inserted into the upper end of said socket member, said socket member comprising a pair of stationary contacts therein, the plug member comprising a tube of insulation having contact ferrules thereon adapted to engage with said stationary contacts, a pair of fuse terminals in said tube, a fuse connecting said fuse terminals, a spring tending to separate said fuse terminals, a member surrounding said fuse for sealing said fuse from the atmosphere, a releasable end cap carried by said tube adjacent its lower end, said end cap connecting one of said fuse terminals with the lower contact ferrule, the lower end of said socket having a straight unobstructed opening to atmosphere to permit the expulsion of said latter fuse terminal and said end cap under the gas pressure generated by the blowing of said fuse.

18. In a device of the class described, a sleeve open at both ends, and a fuse plug insertable in one end, said plug having a cap arranged to be blown out of the other end of said sleeve when the fuse blows.

19. In a device of the class described, an insulating sleeve, terminals in said sleeve, fusible means connecting said terminals, resilient means for drawing one terminal in one direction, and a support for the other terminal adapted to be blown in the other direction when rupture of said fusible element occurs violently.

20. In a device of the class described, a sleeve, a fused plug insertable in one end of said sleeve, a cap on the end of said plug, and an indicator on said cap projecting from the other end of said sleeve.

21. In a device of the class described, a sleeve, a fused plug insertable in one end of said sleeve, and a cap on the end of said plug adapted to be blown out of the other end of said sleeve by violent rupture of the fuse in said plug.

22. In a device of the class described, a sleeve, a fused plug insertable in one end of said sleeve, a cap on the end of said plug adapted to be blown out of the other end of said sleeve by violent rupture of the fuse in said plug, an indicator on said cap projecting from the other end of said sleeve, and means for extinguishing the arc upon gentle rupture of said fuse without blowing out said cap, said means exerting tension on said cap which can be felt by pulling said indicator.

23. In a device of the class described, a tube of insulation, a fixedly mounted terminal member closing one end of said tube, the other end of the tube being reduced, a ferrule on said reduced end, a terminal cap sprung in the end of said ferrule and closing the end of the tube, a fuse connected between the fixedly mounted terminal member and the terminal cap, said cap being free to be blown out by pressure generated in the tube by blowing of the fuse.

24. In an air expulsion fuse, the combination of a casing open at one end, a sleeve terminal at said open end of said casing, a second terminal at the other end of said casing, a connector comprising a central portion having angularly displaced side arms engaging the inside of said sleeve, a fuse connected between said second terminal and the central portion of said connector, and spring means for placing said fuse under tension.

25. In an air expulsion fuse, the combination of a casing, a terminal at one end of said casing, a sleeve terminal at the other end of said casing, a fusible link within said casing and connected at one end with said first terminal, a connector attached through its center to the other end of said link and having springy cylindrical segments adapted to engage the inside of said sleeve terminal, and spring means for placing said link under tension.

26. In an air expulsion fuse, the combination of an insulating shell with metallic end terminals, one of said terminals being sealed and the other unsealed, a fusible link within said shell and connected at one end to said sealed terminal, a sheet metal connector engageable through its center with the other end of said link and having segmental ends adapted to engage the inside of said unsealed terminal, and spring means for placing said link under tension.

27. In an expulsion fuse comprising a casing having a terminal at each end, a fuse between said terminals under spring tension, one of said terminals having a releasable mounting to which one end of said fuse is connected, characterized in that the releasable mounting comprises a flexible member having side arms, adapted to engage and bear against the sides of the terminal and adapted to be released when said tension is released upon the blowing of the fuse.

28. In an expulsion fuse comprising a casing having a terminal at each end, a fuse between said terminals under spring tension, one of said terminals having a releasable mounting to which one end of said fuse is connected, characterized in that the terminal having the releasable mounting is in the form of a sleeve, and in that the releasable mounting is in the form of a flexible metal cap within the sleeve terminal.

29. In a fuse a containing sleeve of insulation having metal terminals, one of said terminals comprising a metal sleeve mounted on the insulating sleeve and extending beyond the end thereof to provide a cylindrical metal bore, a fusible link within the insulating sleeve, a metal connector having spring arms bearing against the inside of the metal sleeve to make contact therewith and to support the connector slidably in the metal sleeve, said connector being electrically connected to one end of the fuse, said connector, upon blowing of the fuse being adapted to be expelled from the outer end of the metal sleeve.

30. In an air expulsion fuse, the combination of a casing open at one end, a sleeve terminal at said open end of said casing, a second terminal at the other end of said casing, a connector comprising a central portion having angularly displaced side arms engaging the inside of said sleeve and closing the open end of the casing, a fuse connected between said second terminal and the central portion of said connector, and spring means within the casing for placing said fuse under tension, said connector being expelled bodily by the pressure created in the casing by blowing of the fuse.

31. In an air expulsion fuse, the combination of a casing, a terminal at one end of said casing, a sleeve terminal at the other end of said casing, a fusible link within said casing and connected at one end with said first terminal, a connector attached through its center to the other end of said link and having springy cylindrical segments adapted to engage the inside of said sleeve terminal, and spring means within the casing for placing said link under tension.

32. In an air expulsion fuse, the combination of an insulating shell with metallic end terminals, one of said terminals being sealed and the other unsealed, a fusible link within said shell and connected at one end to said sealed terminal, a sheet metal connector engageable through its center with the other end of said link and having segmental ends adapted to engage the inside of said unsealed terminal, said connector substantially closing the open end of the casing and being adapted to be expelled bodily upon blowing of the fusible link, and spring means within the casing for placing said link under tension to separate the ends thereof upon melting of the link.

33. In an expulsion fuse comprising a casing having a terminal at each end, a fuse between said terminals under spring tension tending to separate the ends of the fuse when the same melts, a spring within the casing for providing said spring tension, one of said terminals having a releasable mounting to which one end of said fuse is connected, characterized in that the releasable mounting comprises a flexible member having side arms adapted to engage and bear against the sides of the terminal and adapted to be bodily expelled upon the blowing of the fuse and release of the tension.

34. In an expulsion fuse comprising a casing having a terminal at each end, a spring in the casing, a fuse between said terminals held under tension by said spring and tending to separate upon melting of the fuse, one of said terminals having a releasable mounting to which one end of said fuse is connected, characterized in that the terminal having the releasable mounting is in the form of a sleeve, and in that the releasable mounting is in the form of a flexible metal cap within the sleeve terminal, the releasable mounting being adapted to be expelled bodily upon blowing of the fuse.

35. In a fuse a containing sleeve of insulation having metal terminals, one of said terminals comprising a metal sleeve mounted on the insulating sleeve and extending beyond the end thereof to provide a cylindrical metal bore, a fusible link within the insulating sleeve, a spring in the sleeve placing the link under tension and tending to separate the ends thereof upon melting of the fusible link, a metal connector having spring arms bearing against the inside of the metal sleeve to make contact therewith and to support the connector slidably in the metal sleeve, said connector being electrically connected to one end of the fuse, said connector, upon blowing of the fuse being adapted to be expelled bodily from the outer end of the metal sleeve.

36. In a fuse device, the combination of a casing comprising a tubular sleeve of insulation, a metallic ferrule at each end forming mounting terminals for the device, the ferrule at one end being closed and adapted to be disposed uppermost, the ferrule at the other end being open and adapted to be disposed lowermost, a pair of fuse terminals within the casing, a spring within the casing tending to separate the fuse terminals, a fusible element between the terminals, and connections from the fuse terminals to the ferrules, one of said connections comprising a metallic connector slidably mounted in the lower ferrule and adapted to be ejected bodily by blowing of the fusible element and carrying with it the connected fuse terminal.

37. In a fuse device the combination of a casing comprising a tubular sleeve of insulation, a metallic ferrule at each end forming external mounting terminals for the device, the ferrule at one end being closed and adapted to be disposed uppermost, the ferrule at the other end being open and adapted to be disposed lowermost, a pair of fuse terminals within the casing, a spring within the casing tending to separate the fuse terminals and acting to separate them upon melting of the fusible element, a fusible element connecting said fuse terminals, and connections from the fuse terminals to the ferrules, there being a plug like member within the casing and substantially closing the lower end of the casing and being driven bodily out of the casing by gases formed upon blowing of the fuse to carry the lower fuse terminal clear of the casing.

In witness whereof, I hereunto subscribe my name this 4th day of December, 1929.

NICHOLAS J. CONRAD.